United States Patent [19]

Farber et al.

[11] 3,951,906

[45] Apr. 20, 1976

[54] REINFORCED STYRENE-ACRYLONITRILE POLYMERS

[75] Inventors: Milton Farber, Bethany; Henno A. Petersen, Newtown, both of Conn.

[73] Assignee: Uniroyal Inc., New York, N.Y.

[22] Filed: Feb. 28, 1974

[21] Appl. No.: 447,123

Related U.S. Application Data

[63] Continuation-in-part of Ser. No. 285,298, Aug. 31, 1972, abandoned.

[52] U.S. Cl. .................................. 260/42.18
[51] Int. Cl.² .................................. C08K 7/14
[58] Field of Search .................... 260/42, 42.18

[56] References Cited
UNITED STATES PATENTS

| | | | |
|---|---|---|---|
| 3,238,275 | 3/1966 | Calvert | 260/880 |
| 3,474,048 | 10/1969 | Chappelear | 264/174 |
| 3,503,919 | 3/1970 | Cadus | 260/37 |
| 3,639,331 | 2/1972 | Hattori | 264/108 |
| 3,644,271 | 2/1972 | Tulley | 260/42.18 |
| 3,654,219 | 4/1972 | Boyer | 260/37 PC |

*Primary Examiner*—Paul R. Michl
*Attorney, Agent, or Firm*—Thomas A. Beck

[57] ABSTRACT

A composition comprising thermoplastic copolymers of styrene or substituted styrene with acrylonitrile or substituted acrylonitriles or acrylonitrile-butadiene-styrene polymers in admixture with a combination of a discontinuous glass fiber and a particulate filler.

13 Claims, No Drawings

REINFORCED STYRENE-ACRYLONITRILE POLYMERS

This application is a continuation-in-part of U.S. application Ser. No. 285,298, filed Aug. 31, 1972 now abandoned.

The present invention relates to a composition of matter comprising either thermoplastic copolymers of styrene or substituted styrene with acrylonitrile or substituted acrylonitrile or an acrylonitrile-butadiene-styrene (ABS) interpolymer in admixture with a combination of discontinuous glass fiber and a particulate filler. More particularly, the present invention relates to a composition of matter as described above which can be formed into reinforced plastic articles having desirable modulus and impact properties.

Although the addition of fibers or fillers to thermoplastic polymers for reinforcement, cost lowering, and other purposes is well known, the inclusion of combinations of discontinuous fibers and particulate fillers together is rare. British Pat. No. 1,134,422, describes hydrocarbon homopolymers or copolymers made from olefinically unsaturated hydrocarbons such as ethylene and propylene blended with mixtures of many types of discontinuous fibers and particulate fillers, but exemplifies only asbestos fibers in combination with talc or calcium carbonate. The products resulting from said composition possess higher modulus and lower creep. However, the use of combinations of discontinuous glass fibers with particulate fillers to produce high impact resistance in thermoplastic acrylonitrile and styrene containing polymers is not disclosed.

U.S. Pat. No. 3,524,286 discloses improved grinding efficiency, tensile strength, and higher bursting speed in resin-bonded abrasive wheels. The patent teaches the manufacture of a fiber-filled abrasive wheel which may also contain a particulate material.

The use of spherical glass particles, together with glass fiber in nylon and epoxy resins, has been described in Potters Bros. Inc. Tech. Bulletin T24-1, and by H. Wells (22nd Annual Meeting, Reinforced Plastics Division, S.P.I., 1967).

Inclusion of a high modulus particulate filler into a thermoplastic resin generally results in a composite material which has a higher modulus than the pure resin. With a brittle resin, such as styrene-acrylonitrile copolymer (SAN), the impact resistance of the composite remains very low as the filler content is increased. With an impact resistant plastic such as ABS, impact resistance decreases very drastically when a particulate filler is added, rapidly reaching the very low values shown by brittle resins, which are close to zero.

The addition of discontinuous glass fiber to a thermoplastic resin generally raises the modulus as expected and will usually either increase or maintain the impact strength depending upon the length of the fiber and nature of the resin.

The present invention represents a method of maintaining and/or achieving high impact strength in thermoplastic styrene-acrylonitrile polymers containing particulate fillers. This is accomplished by the inclusion of discontinuous glass fiber in combination with particulate filler, so that the three components — resin matrix, fiber and particulate — form a homogeneous reinforced blend, with unexpectedly high impact resistance.

The thermoplastics utilizable in this invention are copolymers of the styrene-acrylonitrile family, or impact plastics derived therefrom such as ABS. Instead of styrene one may use nuclear or side chain-substituted styrenes. Examples of such compounds are styrenes substituted with alkyl groups containing 1 to 10 carbon atoms either in the side chain or nucleus. Preferred substituted styrenes are t-butylstyrene or $\alpha$-methylstyrene. Instead of acrylonitrile, substituted acrylonitriles such as $\alpha$-methacrylonitrile, crotononitrile, etc., may be used. The composition of the styrene-acrylonitrile copolymer may vary within the range 20% to 40% acrylonitrile, and the molecular weight may lie in the 50,000 to 1 million range.

Impact resistant ABS plastics to be used in this invention typically may contain 5% to 50% of a rubber such as polybutadiene or styrene-butadiene rubber, (containing not less than 55% butadiene) graft copolymerized with a mixture of 60 to 80% styrene or substituted styrene, and 20 to 40% acrylonitrile or substituted acrylonitrile, and dispersed in the form of small particles in a continuous SAN resin phase. The amount of monomer mixture used in forming the graft copolymer typically varies from 20 to 100% of the weight of the starting rubbery polymer. Such plastics and their methods of preparation are well known and are described in U.S. Pat. Nos. 2,439,202; 2,600,024; 2,820,773; 3,238,275; as well as in "ABS Plastics" by C. H. Basdekis, Reinhold Publishing Corp., 1964, the contents of which are hereby incorporated by reference herein.

A broad range of particulate fillers is applicable in the present invention. These may be pure elements, or the oxides, salts, or other compounds of metallic elements, or more complex substances found in nature or prepared by man. Some examples are charcoal, graphite, aluminum, iron oxide, calcium carbonate, silica, alumina, talc, clay, limestone, etc. Mixtures of two or more such particulates may also be used. The term "particulate" is used herein as defined in Webster's New Collegiate Dictionary 2nd Edition, 1959, as being "the adjective of particle" referring to "an extremely small piece." The particulate used in accordance with the present invention possesses a length ($l$) to diameter or cross sectional dimension ($d$) ratio of approximately one.

A reasonable upper limit for the particle size would be approximately 0.005 inch diameter although particles with a diameter up to 0.04 inch can be used.

The glass fiber to be used in this invention may be of any type which consists of strong, tough, discontinuous filaments, such as the commercially available E or S glass manufactured by Owens Corning, Inc. The glass fiber is preferably used in the form of chopped strand, consisting of hundreds of discontinuous individual filaments which have a diameter between $10^{-2}$ and $10^{-5}$ inch, preferably between $10^{-3}$ and $10^{-4}$. The lower limit of filament length is such that the average length-to-diameter ratio is at least 20, but preferably much greater, such as several hundred. The maximum fiber length depends on processing and application requirements. The discontinuous fibers are distributed throughout the thermoplastic resin matrix in random fashion, as opposed to being arranged as a part of an organized assembly, be it a textile fabric, mat or roving, etc. For injection moldable compositions, the initial fiber length, i.e. the length prior to mixing is preferably $\frac{1}{8}$ to $\frac{1}{2}$ inch although greater lengths are useable provided the length of said fibers is less than the longest dimension of the finished composite article. The fiber length will usually decrease from its initial value due to shearing of the glass during processing, so that the ultimate length of same will depend upon the types and severity of the processing.

The overall makeup of the composition which represents this invention is as follows:

Component A

A styrene-acrylonitrile resin or impact plastic (such as ABS) derived therefrom, in the amount of 30% to 90% by weight of the total composite blend of three components.

Component B

A particulate filler, as described above, in the amount of 5% to 65% by weight of the total composite blend.

Component C

Discontinuous glass fiber, as described above, in the amount of 5% to 65% by weight of the total composite blend.

The preferred compositions contain from 40% to 80% Component A, and between 10% and 30% by weight of each of Components B and C. Components B and C need not be present in equal amounts.

The three component blend may be prepared by any convenient means, such as dry mixing in which Component A is in powder or pellet form; or latex blending in which Component A is in the form of an aqueous emulsion or suspension; or solution blending in which Component A has been dissolved in any appropriate solvent. Extrusion compounding, mill blending, Banbury mixing, etc., are also acceptable, but it must be realized that these methods involve shear, and the cumulative effects of shear have an adverse effect on the impact strength of the composite, because they decrease the fiber length. The sequence of mixing is not critical. The blending procedure should strive for the most homogeneous distribution of the three components, consonant with minimum decrease in fiber length.

The composite blend may be molded with heat and pressure into the desired final article, using equipment conventionally employed for molding of thermoplastics.

Examples include compression molding, injection molding, extrusion, thermoforming, etc. Pressures and temperatures will generally be higher than with unreinforced plastics, because the fibrous and particulate fillers increase the melt viscosity of the composite.

Although the impact strength of the resin-fiber-particulate composite may decrease as the fiber length decreases, a unique feature of this invention is that the impact strength of the composite is comparable to that which could be obtained by using glass fiber alone in the resin. This behavior will be apparent in the examples give below. The unexpected retention or increase of impact strength is contrary to the result obtained when a particulate filler is added to a plastic, as disclosed in Encyclopedia of Polymer Science and Technology, Volume 12 (Interscience) which states on page 54 ". . . When particulate fillers are used in rigid polymers there is usually little enhancement in physical properties . . . In many instances ultimate failure properties are actually decreased by the filler."

Other advantages of the instant composition over the prior art, i.e. plastics reinforced with either fiber or particulate filler alone, are:

1. both discontinuous fiber and particulate filler increase the modulus so that the combination offers higher modulus than either used alone;
2. the deflection termperature with combination noted in 1. above is higher in many instances than is obtained with either material used alone;
3. the combination usually results in a smoother surface, after molding, than is obtained when the fiber is used alone.

The composition of the present invention can be used wherever combinations of light weight, high strength and high stiffness are needed. Typical applications are exterior and interior automotive parts (grills, headlamp housings, dashboards, supporting pillars), appliance handles, bodies for recreational vehicles (trailers, boats and snowmobiles) and furniture.

The following specific examples describe the manner in which the novel composition of the present invention is prepared. These examples are given for illustrative purposes only and are not intended to limit the invention to the specific proportions and uses set forth.

EXAMPLE 1

Styrene-acrylonitrile (70/30) copolymer (SAN) latex was blended with ¼ inch chopped strand glass fiber and powdered $Fe_2O_3$, in the proportions listed below in Table 1. The latex blend was stirred manually, then coflocculated with hot 10% $MgSO_4$ solution. The precipitate, consisting of a crumb which contained SAN, fiber and $Fe_2O_3$, was isolated by filtration, dried and compression molded at 360°F. Control samples were also prepared using similar procedure. The following physical properties were found:

TABLE I

| Composition | Notched Izod Impact ft-lb/in. | Torsional Modulus, $10^5$ psi | Deflection Temp. °C. |
|---|---|---|---|
| 100% SAN | 0.2 | 1.5 | 95 |
| 75% SAN + 25% $Fe_2O_3$ | 0.2 | 2.2 | 95 |
| 75% SAN + 25% glass fiber | 4.2 | 2.9 | 98 |
| 50% SAN + 25% $Fe_2O_3$ + 25% glass fiber | 3.9 | 3.8 | 100 |

This example demonstrates the unexpected combination of reinforcement (elevated modulus) plus high impact strength obtained by use of a combination of iron oxide and glass fiber. The inherent impact strength of the SAN resin is very low (0.2 ft.lb./in.) as is that of the iron oxide filled sample. It would have been expected that the presence of the particulate filler, even in combination with the glass, would produce this same low impact strength, since these particulate fillers are known to be highly deleterious to impact strength. Instead, the impact strength is essentially the same as with the glass fiber alone in the SAN.

EXAMPLE 2

An ABS latex was prepared containing emulsified styrene-acrylonitrile resin (70/30) combined with an equal weight of 70/30 stryene-acrylonitrile monomer mixture grafted onto 10/90 styrene-butadiene rubber. The ratio of resin to grafted rubber was 60/40. This latex was blended with ¼ inch chopped strand glass fiber and powdered charcoal, in the proportions listed below. The latex-fiber blend was stirred manually, then coflocculated with hot 10% $MgSO_4$ solution. The precipitate, consisting of a crumb which contained ABS, fiber and charcoal, was isolated by filtration, dried and compression molded at 360°F. The physical properties found are listed in Table 2. Control samples were similarly prepared.

TABLE 2

| Composition | Notched Izod Impact ft-lb/in. | Flexural Modulus 10$^5$ psi | Deflection Temp. °C. |
|---|---|---|---|
| 100% ABS | 2.0 | 2.4 | 80 |
| 85% ABS + 15% charcoal | 0.2 | 3.5 | 93 |
| 85% ABS + 15% glass fiber | 6.0 | 3.8 | 90 |
| 70% ABS + 15% charcoal + 15% glass fiber | 3.2 | 5.4 | 99 |

This example using ABS resin reinforced with a mixture of glass fiber and charcoal powder reveals a phenomenon similar to that demonstrated in Example 1. The deleterious effect of the particulate filler on the impact strength of the ABS is shown by its tenfold decrease when 15% charcoal alone is present. The combination of charcoal with glass fiber exhibits an unexpectedly high impact strength.

EXAMPLE 3

Dry ABS powder of the same composition disclosed in Example 2 was blended with ¼ inch chopped strand glass fiber and powdered $CaCO_3$, by shaking in a closed container. The dry blend was molded at 400°F. in a plunger type injection molding machine. Controls were similarly prepared. The molded composite has the physical properties:

TABLE 3

| Composition | Notched Izod Impact ft-lb/in. | Flexural Modulus, 10$^5$ psi |
|---|---|---|
| 100% ABS | 2.8 | 2.7 |
| 60% ABS + 40% glass fiber | 5.0 | 12.5 |
| 50% ABS + 25% glass fiber + 25% $CaCO_3$ | 5.5 | 9.6 |

This example demonstrates the same points as Examples 1 and 2. In this example the components ($CaCO_3$, glass fiber and ABS) were mixed by dry blending rather than blending filler with latex, and the resultant compositions were injection molded rather than compression molded.

EXAMPLE 4

Alpha-methylstyrene-31% acrylonitrile copolymer (AMS-AN) latex was blended with ¼ inch chopped strand glass fiber and powdered $CaCO_3$, in the proportions listed below. The latex blend was stirred manually, then coflocculated with hot 10% $MgSO_4$ solution. The precipitate, consisting of a crumb which contained the resin and both fillers, was isolated by filtration, dried, and compression molded at 360°F. The following physical properties were found:

TABLE 4

| Composition | Notched Izod Impact ft-lb/in. | Torsional Modulus, 10$^5$ psi |
|---|---|---|
| 100% AMS-AN | 0.2 | 1.7 |
| 75% AMS-AN + 25% $CaCO_3$ | 0.2 | 2.0 |
| 75% AMS-AN + 25% glass fiber | 3.0 | 2.5 |
| 50% AMS-AN + 25% $CaCO_3$ + 25% glass fiber | 2.9 | 2.8 |

The following ASTM tests were used to determine the various properties listed in the examples: D256-56-impact resistance; D-1043-69-torsional modulus; D790-66-flexural modulus; D648-56-deflection temperature.

In the example set forth above, the particulate fillers listed had maximum cross sectional dimensions of 0.003 in. for $CaCO_3$; 0.001 in. for $Fe_2O_3$ and 0.004 in. for charcoal.

We claim:
1. A blend composition comprising:
   A. between about 40% and 60% of a styrene-acrylonitrile copolymer;
   B. between about 20% and 30% of $CaCO_3$ which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.
2. A blend composition comprising:
   A. between about 40% and 80% of a styrene-butadiene-acrylonitrile interpolymer;
   B. between about 10% and 30% charcoal which has a maximum cross sectional dimension of 0.005 inch;
   C. between about 10% and 30% of a discontinuous glass fiber having diameter between $10^{-3}$ and $10^{-4}$ inches; said percentages herein being based upon the total weight of said blend.
3. A blend composition comprising:
   A. between about 40% and 60% of a styrene-acrylonitrile copolymer;
   B. between about 20% and 30% of $Fe_2O_3$ which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.
4. A blend composition comprising:
   A. between about 40% and 60% of a styrene-butadiene-acrylonitrile interpolymer;
   B. between about 20% and 30% of $CaCO_3$ which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.
5. A blend composition comprising:
   A. between about 40% and 60% of a styrene-acrylonitrile copolymer;
   B. between about 10% and 30% charcoal which has a maximum cross sectional dimension of 0.005 inch;
   C. between about 10% and 30% of a discontinuous glass fiber having diameter between $10^{-3}$ and $10^{-4}$

6. A blend composition comprising:
   A. between about 40% and 60% of a styrene-butadiene-acrylonitrile copolymer
   B. between about 20% and 30% $Fe_2O_3$ which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.

7. A blend composition comprising:
   A. between about 40% and 60% of a α-methylstyrene-acrylonitrile copolymer;
   B. between about 20% and 30% of $CaCO_3$ which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.

8. A blend composition comprising:
   A. between about 40% and 60% of a styrene-butadiene-acrylonitrile interpolymer;
   B. between about 20% and 30% silica which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.

9. A blend composition comprising:
   A. between about 40% and 60% of a styrene-acrylonitrile copolymer;
   B. between about 20% and 30% silica which has a maximum cross sectional dimension of 0.005 inch;
   C. between about 20% and 30% of a discontinuous glass fiber having diameter between $10^{-3}$ and $10^{-4}$ inches; said percentages herein being based upon the total weight of said blend.

10. A blend composition comprising:
    A. between about 40% and 60% of a styrene-butadiene-acrylonitrile interpolymer;
    B. between about 20% and 30% talc which has a maximum cross sectional dimension of 0.005 inch;
    C. between about 20% and 30% of a discontinuous glass fiber having dimension between $10^{-3}$ and $10^{-4}$ inches; said percentages herein being based upon the total weight of said blend.

11. A blend composition comprising:
    A. between about 40% and 60% of a styrene-acrylonitrile copolymer;
    B. between about 20% and 30% talc which has a maximum cross sectional dimension of 0.005 inch;
    C. between about 20% and 30% of a discontinuous glass fiber having diameter between $10^{-3}$ and $10^{-4}$ inches; said percentages herein being based upon the total weight of said blend.

12. A blend composition comprising:
    A. between about 40% and 60% of a styrene-butadiene-acrylonitrile interpolymer;
    B. between about 20% and 30% mica which has a maximum cross sectional dimension of 0.005 inch;
    C. between about 20% and 30% of a discontinuous glass fiber having diameter between $10^{-3}$ and $10^{-4}$ inches; said percentages herein being based upon the total weight of said blend.

13. A blend composition comprising:
    A. between about 40% and 60% of a styrene-acrylonitrile copolymer
    B. between about 20% and 30% talc which has a maximum cross sectional dimension of 0.005 inch;
    C. between about 20% and 30% of a discontinuous glass fiber having diameter between $10^{-3}$ and $10^{-4}$ inches; said percentages herein being based upon the total weight of said blend.

* * * * *

UNITED STATES PATENT AND TRADEMARK OFFICE
CERTIFICATE OF CORRECTION

PATENT NO. : 3951906
DATED : April 20, 1976
INVENTOR(S) : MILTON FARBER ET AL.

It is certified that error appears in the above–identified patent and that said Letters Patent are hereby corrected as shown below:

In column 8, line 9, "dimension" should read -- diameter --.

Signed and Sealed this

First Day of November 1977

[SEAL]

Attest:

RUTH C. MASON
*Attesting Officer*

LUTRELLE F. PARKER
*Acting Commissioner of Patents and Trademarks*